US008281406B2

(12) United States Patent
Uchikawa (10) Patent No.: US 8,281,406 B2
(45) Date of Patent: Oct. 2, 2012

(54) IMAGE PROCESSING APPARATUS AND REINSTALLATION METHOD THEREFOR

(75) Inventor: Hiroshi Uchikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 995 days.

(21) Appl. No.: 12/268,942

(22) Filed: Nov. 11, 2008

(65) Prior Publication Data

US 2009/0133128 A1    May 21, 2009

(30) Foreign Application Priority Data

Nov. 16, 2007  (JP) ................................ 2007-298397

(51) Int. Cl.
*G06F 7/04* (2006.01)
(52) U.S. Cl. ............... 726/26; 726/27; 726/28; 705/51; 705/59; 713/189; 713/191
(58) Field of Classification Search .................... 705/51, 705/59; 726/26, 27, 28; 713/189, 191; 717/168, 717/169, 170, 172
See application file for complete search history.

(56) References Cited

U.S. PATENT DOCUMENTS

| | | | | |
|---|---|---|---|---|
| 5,327,563 A * | 7/1994 | Singh | ............... | 713/193 |
| 5,422,762 A * | 6/1995 | Jerbic | ............... | 360/48 |
| 5,953,532 A * | 9/1999 | Lochbaum | ............. | 717/176 |
| 6,009,401 A * | 12/1999 | Horstmann | ............ | 705/317 |
| 6,073,123 A * | 6/2000 | Staley | ............... | 705/58 |
| 6,324,649 B1 * | 11/2001 | Eyres et al. | ............. | 726/5 |
| 7,174,549 B2 * | 2/2007 | Yoo | ............... | 717/174 |
| 7,731,093 B2 * | 6/2010 | Isemura et al. | ............. | 235/492 |
| 7,836,507 B2 * | 11/2010 | Ono et al. | ............. | 726/26 |
| 2001/0013099 A1 * | 8/2001 | Haruki | ............. | 713/202 |
| 2002/0188704 A1 * | 12/2002 | Gold et al. | ............. | 709/221 |
| 2003/0172035 A1 * | 9/2003 | Cronce et al. | ............. | 705/59 |
| 2003/0182563 A1 * | 9/2003 | Liu et al. | ............. | 713/191 |
| 2004/0143746 A1 * | 7/2004 | Ligeti et al. | ............. | 713/185 |
| 2005/0044404 A1 * | 2/2005 | Bhansali et al. | ............. | 713/200 |
| 2005/0289075 A1 * | 12/2005 | Murphy et al. | ............. | 705/59 |
| 2010/0293622 A1 * | 11/2010 | Nikitin et al. | ............. | 726/31 |

FOREIGN PATENT DOCUMENTS

| | | |
|---|---|---|
| JP | 10-171635 A | 6/1998 |
| JP | 2006-40217 A | 2/2006 |
| JP | 2006040217 A | 2/2006 |

* cited by examiner

*Primary Examiner* — Mamon Obeid
(74) *Attorney, Agent, or Firm* — Canon U.S.A., Inc. IP Division

(57) ABSTRACT

An image processing apparatus includes an installation unit configured to install an application for image processing and license information regarding the application, an information setting unit configured to set, as threshold information, operation restriction information, which is included in the license information, regarding the application, a counting unit configured to count operation information regarding an operation of the application, an application operation restriction unit configured to restrict an operation of the application according to the threshold information and the counted operation information, a reinstallation unit configured to reinstall the application, and an information setting control unit configured to inhibit the information setting unit from setting, as the threshold information, the operation restriction information, which is included in the license information, regarding the application reinstalled by the reinstallation unit.

4 Claims, 13 Drawing Sheets

- BOOTPRG — 4001 BASIC PROGRAM PARTITION
- TEMP — 4002 TEMPORARY USE PARTITION
- APPS — 4003 APPLICATION PARTITION
- LICS — 4004 LICENSE BACKUP PARTITION

FIG.5

5001 — APPLICATION NAME: EASY COPYING
5002 — APPLICATION IDENTIFIER: f7b8ac1c-895a-4905-86c7-40273fe0a531
5003 — EXPIRATION DATE: 30
5004 — UPPER LIMIT OF PRINTING: 1000
5005 — UPPER LIMIT OF SCANNING: 1000
5006 — LICENSE INFORMATION
hQIOAyuoG4ZoMID/EAf+OVQ1mG6Jxp8kCGcZz6QLi2hdZNsrSRpQB
noaK9wlFQCeAyROJx5Vljlv sHLjeTgRYIxmWkWIKwOTfBcRJVg6TNsAwnOyGtjSa9IQXmj2tsruxzbc
N9qahfq/oKkkSAWrCv
ZyiR327
xkTfqfnki/og1ypvQyxbBXOvvFjA+U6gIADChQ0ayfO4HRg==

FIG.7

| APPLICATION IDENTIFIER | EXPIRATION DATE | REMAINING DATE COUNT | UPPER LIMIT OF PRINTING | PRINTER COUNT | UPPER LIMIT OF SCANNING | SCANNED SHEET COUNT |
|---|---|---|---|---|---|---|
| 1 | — | 0 | 0 | 0 | 0 | 0 |
| 2 | — | 0 | 0 | 0 | 0 | 0 |
| 3 | — | 0 | 0 | 0 | 0 | 0 |
| 4 | — | 0 | 0 | 0 | 0 | 0 |
| 5 | — | 0 | 0 | 0 | 0 | 0 |
| ... | ... | ... | ... | ... | ... | ... |

FIG.8

| | APPLICATION IDENTIFIER | EXPIRATION DATE | REMAINING DATE COUNT | UPPER LIMIT OF PRINTING | PRINTER COUNT | UPPER LIMIT OF SCANNING | SCANNED SHEET COUNT |
|---|---|---|---|---|---|---|---|
| | 8001 | 8002 | | 8003 | | 8004 | |
| 1 | f7b8ac1c-895a-4905-86c7-40273fe0a531 | 30 | 0 | 1000 | 0 | 1000 | 0 |
| 2 | — | 0 | 0 | 0 | 0 | 0 | 0 |
| 3 | — | 0 | 0 | 0 | 0 | 0 | 0 |
| 4 | — | 0 | 0 | 0 | 0 | 0 | 0 |
| 5 | — | 0 | 0 | 0 | 0 | 0 | 0 |
| ... | ... | ... | ... | ... | ... | ... | ... |

| | APPLICATION IDENTIFIER | EXPIRATION DATE | REMAINING DATE COUNT | UPPER LIMIT OF PRINTING | PRINTER COUNT | UPPER LIMIT OF SCANNING | SCANNED SHEET COUNT |
|---|---|---|---|---|---|---|---|
| | | 13001 | 13002 | 13003 | 13004 | 13005 | 13006 |
| 1 | f7b8ac1c-895a-4905-86c7-40273fe0a531 | 30 | 5 | 1000 | 289 | 1000 | 120 |
| 2 | — | 0 | 0 | 0 | 0 | 0 | 0 |
| 3 | — | 0 | 0 | 0 | 0 | 0 | 0 |
| 4 | — | 0 | 0 | 0 | 0 | 0 | 0 |
| 5 | — | 0 | 0 | 0 | 0 | 0 | 0 |
| ... | ... | ... | ... | ... | ... | ... | ... |

FIG.14

IMAGE PROCESSING APPARATUS AND REINSTALLATION METHOD THEREFOR

BACKGROUND OF THE INVENTION

1. Field of the Invention

The present invention relates to an image processing apparatus and a reinstallation method therefor.

2. Description of the Related Art

In recent years, in the field of image processing apparatuses such as a multifunction peripheral, an environment for application execution of image processing apparatuses has been put into place using, for example, JAVA®.

The image processing apparatuses including the environment enable an end user to select and purchase a desired application, and to install and uninstall the application as necessary. Therefore, numerous combinations of application execution environments and applications are available. Accordingly, a failure is more likely to occur during operations in the environments than in other environments for application execution where only a preset function operates. Up to now, various measures for recovering from such a failure have been performed. As for recovery from a failure in updating an application, for example, a method for restoring the application to an old version is proposed as discussed in Japanese Patent Application Laid-Open No. 10-171635.

On the other hand, some image processing apparatuses can set, as license information of an application, the expiration date or the maximum allowable number of operations of a predetermined function (for example, a reading function, a facsimile or e-mail transmission function, and a document printing function). Further, license information of an application can include information identifying specific image processing apparatuses allowed to install the application thereon, thus preventing other apparatuses from using the application, as discussed in Japanese Patent Application Laid-Open No. 2006-40217.

If the expiration date or the maximum allowable number of operations of a function is set as license information of an application, the expiration date or the maximum allowable number of operations is read out from the license information upon application installation and stored in a non-volatile storage medium to be managed under an application execution environment.

If an application is reinstalled simply by reusing license information stored as a backup for the purpose of failure recovery, the expiration date or the like is extracted from the license information and stored (or added) in the non-volatile storage medium again upon reinstallation. As a result, a problem of increasing (adding) the expiration date or the maximum allowable number of operations occurs. For example, when an application valid for 20 days is installed and the application is then reinstalled 10 days later, information indicating the 20-day valid period is additionally stored in the non-volatile storage medium upon reinstallation. Thus, the valid period may be reset to 20 days (or if added, to 30 days).

SUMMARY OF THE INVENTION

The present invention is directed to a technique for preventing such a situation that, if an application is reinstalled, operation restriction information included in license information regarding the application is increased or added.

According to an aspect of the present invention, an image processing apparatus includes an installation unit configured to install an application for image processing and license information regarding the application, an information setting unit configured to set, as threshold information, operation restriction information, which is included in the license information, regarding the application, a counting unit configured to count operation information regarding an operation of the application, an application operation restriction unit configured to restrict an operation of the application according to the threshold information and the counted operation information, a reinstallation unit configured to reinstall the application, and an information setting control unit configured to inhibit the information setting unit from setting, as the threshold information, the operation restriction information, which is included in the license information, regarding the application reinstalled by the reinstallation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
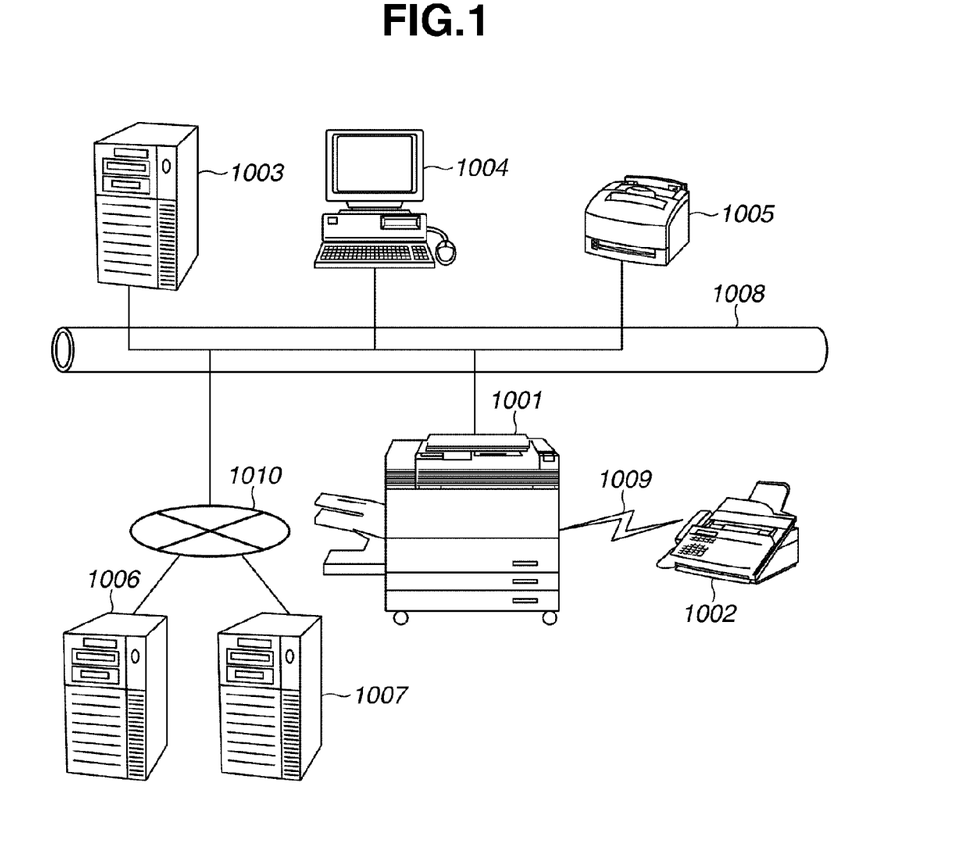
FIG. 1 illustrates an example of system configuration.

FIG. 1 illustrates an example of a system configuration. An image processing apparatus 1001 is an apparatus (computer) that scans an original and transmitting the resultant data to various devices. A facsimile machine 1002 receives data read by the image processing apparatus 1001 via a public line 1009 to print out the data. A file server/mail server 1003 is a computer where server software for storing data read by the image processing apparatus 1001 or data stored in the image processing apparatus 1001 is operating.

A client computer 1004 is a computer, connected to the file server/mail server 1003, to download data from the file server/mail server 1003 and to display the data. A printer 1005 is a printing apparatus configured to print image data read by the image processing apparatus 1001 or page description language (PDL) data generated by the client computer 1004. A software transmission server 1006 is a computer configured to have and transmit a read only memory (ROM) program of the image processing apparatus 1001, a program execution environment, and an installable application.

A license management server 1007 is a computer configured to issue a license for an application stored in the software transmission server 1006, and a license for an additional function of the image processing apparatus 1001.

The image processing apparatus 1001, the file server/mail server 1003, the client computer 1004, and the printer 1005 are connected to a network 1008, for example, Ethernet®, which is constructed in offices or educational facilities. The Internet 1010 is a network to which the software transmission server 1006 and the license management server 1007 are connected. The network 1008 and the Internet 1010 are connected via a gateway (not illustrated) to allow information communication with each other.

Figure 2:
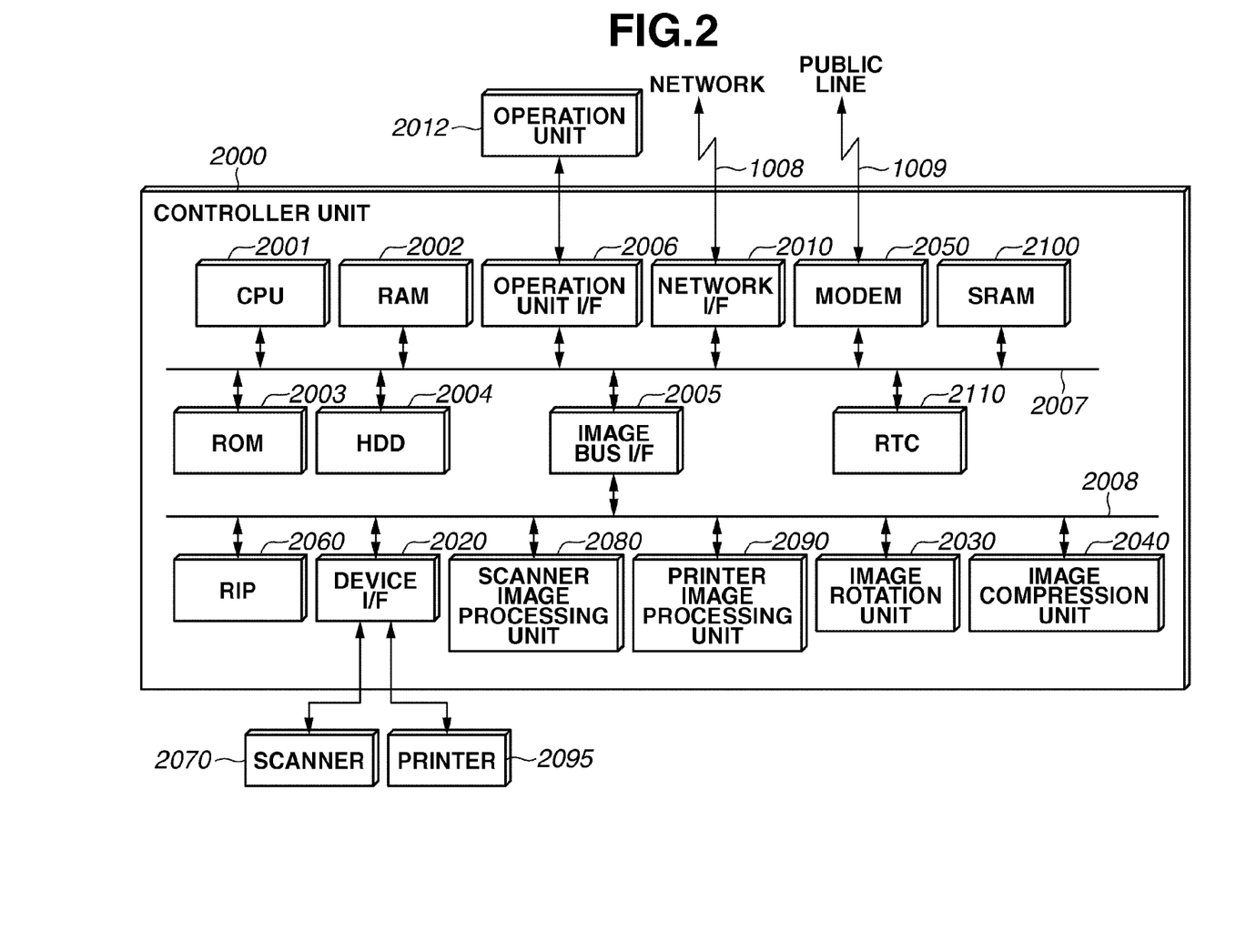
FIG. 2 illustrates an example of configuration of a system (or hardware) implemented on an image processing apparatus.

FIG. 2 illustrates an example of configuration of a system (or hardware) implemented on the image processing apparatus 1001.

A controller unit 2000 is connected to a scanner 2070 as an image input device, a printer 2095 as an image output device, a network 1008, and a public line 1009 to input/output image information or device information. A CPU 2001 is a controller configured to control the entire system. A random access memory (RAM) 2002 is a work memory of the system and an image memory for temporarily storing image data. A ROM 2003 is a boot ROM, which stores a boot program for the system.

An HDD 2004 stores system software, applications, and image data. An operation unit interface (I/F) 2006 is an interface unit for an operation unit 2012, which includes a touch panel. The operation unit I/F 2006 outputs image data to the operation unit 2012 to be displayed thereon. Further, the operation unit I/F 2006 transfers information input by a user of this system using the operation unit 2012 to the CPU 2001.

A network I/F 2010 is connected to the network 1008 to input/output information. A modulator-demodulator (MO-DEM) 2050 is connected to the public line 1009 to input/output information. A static random access memory (SRAM) 2100 is a high-speed non-volatile storing medium. A real-time clock (RTC) 2110 keeps timing even if the controller unit 2000 is powered off. The above devices are connected to a system bus 2007.

An image bus I/F 2005 is a bus bridge that connects the system bus 2007 and an image bus 2008 that transfers image data at high speed to transform data structure. The image bus 2008 is configured by a protocol control information (PCI) bus or Institute of Electrical and Electronics Engineers (IEEE) 1394. The above devices are connected to the image bus 2008.

A raster image processor (RIP) 2060 rasterizes page description language (PDL) code to a bit-mapped image. A device I/F 2020 connects the scanner 2070 or printer 2095 as an image input/output device with the controller unit 2000 to transform a synchronous system/asynchronous system of image data.

A scanner image processing unit 2080 corrects, processes, and edits input image data. A printer image processing unit 2090 adjusts printer setting and converts resolution of printout image data. An image rotation unit 2030 rotates image data. An image compression unit 2040 compresses/decompresses multi-valued image data to Joint Photographic Experts Group (JPEG) format, or binary image data to Joint Bi-level Image Experts Group (JBIG), Modified Modified Read (MMR), or Modified Huffman (MH) format.

Figure 3:
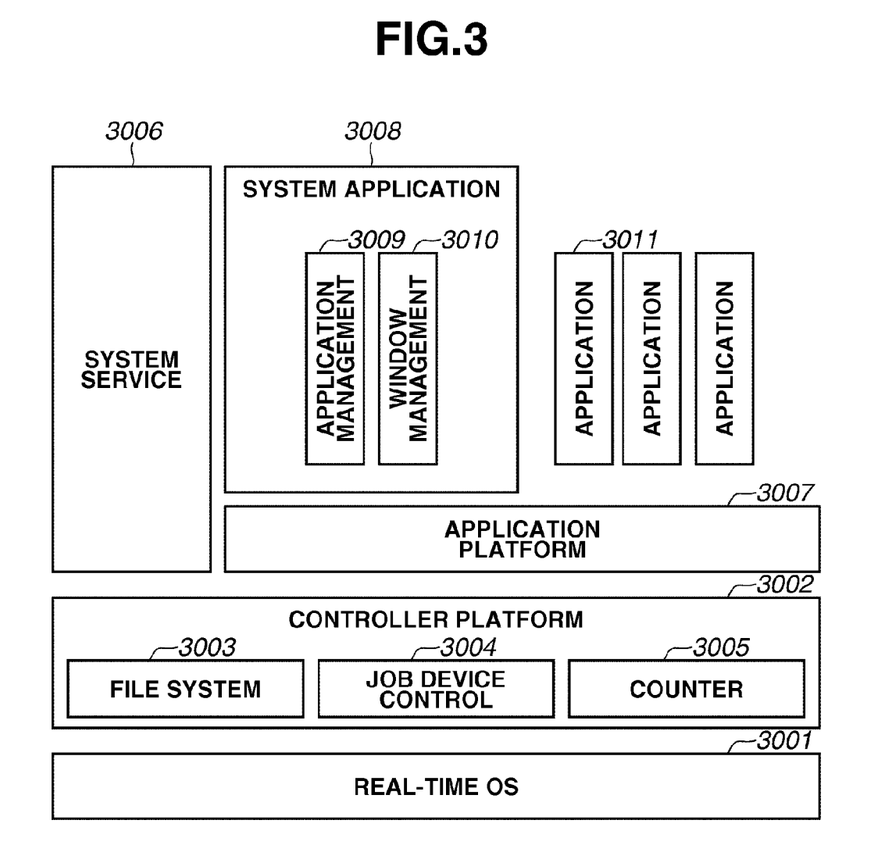
FIG. 3 illustrates an example of software configuration of an image processing apparatus.

FIG. 3 illustrates an example of software configuration of the image processing apparatus 1001. The software illustrated in FIG. 3 is installed in the controller unit 2000 of the image processing apparatus 1001.

The software installed in the image processing apparatus 1001 to be processed by the controller unit 2000 is firmware to be executed by the CPU 2001.

A real-time operating system (OS) 3001 provides various services and schemes for resource management optimized to control an embedded system to software running thereon. Various services and schemes for resource management provided by the real-time OS 3001 include multitask (thread) management for managing a plurality of execution contexts of processing executed by the CPU 2001 to thereby perform a plurality of processing substantially in parallel. In addition, the services and schemes also include inter-task communication for synchronizing tasks or exchanging data, memory management, interrupt control, various device drivers, and protocol stack implemented with processing of various protocols, such as local interfaces or network communications.

A controller platform 3002 includes a file system 3003, a job device control 3004, and a counter (threshold information) 3005.

The file system 3003 stores data formed on a storage device such as the HDD 2004 and the RAM 2002. The file system 3003 spools jobs in the controller unit 2000 and stores various types of data. The job device control 3004 controls hardware of the image processing apparatus 1001 and controls jobs that use basic functions, such as printer function, scanner function, communication function, image conversion function, mainly provided by the hardware of the image processing apparatus 1001. The counter 3005 is configured in the SRAM 2100. The counter 3005 stores the expiration date of each application, the maximum allowable number of printing/scanning operations, and a count value of a counter.

A system service 3006 is a module for monitoring an operational status of the image processing apparatus 1001. Further, the system service 3006 downloads software (applications) or licenses (license files) from the software transmission server 1006 via the network 1008.

An application platform 3007 is middleware to allow the system application 3008 and an additional application 3011 to use the real-time OS 3001 and the controller platform 3002.

A system application 3008 includes an application management 3009 and a window management 3010. The application management 3009 is a management module that manages installation, uninstallation, start-up, and halt of the application 3011. The window management 3010 is a module that manages a window of each application and displays a window of a selected application on the operation unit 2012.

The application 3011 is applied software that realizes various business models using functions provided by the application platform 3007.

Figure 4:
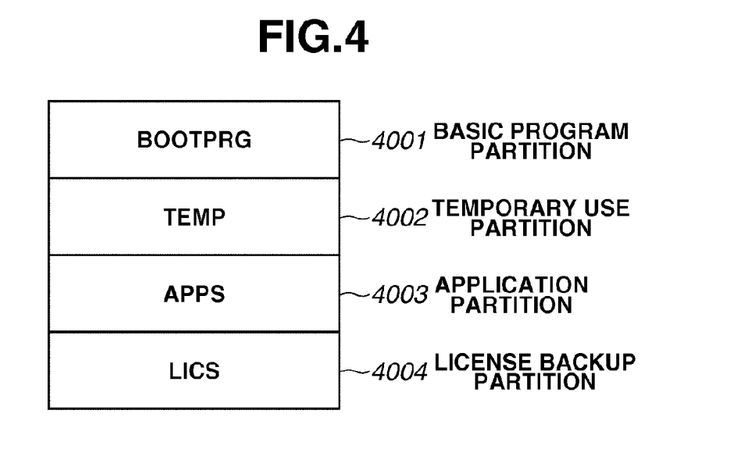
FIG. 4 illustrates an example of disk partition configuration of a hard disk drive (HDD).

FIG. 4 illustrates an example of a disk partition configuration of the HDD 2004. A basic program partition 4001 stores the real-time OS 3001, the controller platform 3002, the system service 3006, the application platform 3007, and the system application 3008. The service or application stored in this partition is system software, which is installed in the image processing apparatus 1001 in advance.

A temporary use partition 4002 temporarily stores software downloaded from the software transmission server 1006 or data generated by the application.

An application partition 4003 is used to be reallocated from the basic program partition 4001 such that the application platform 3007 or the system application 3008 can use functions thereof. Moreover, the application partition 4003 stores the application 3011 additionally installed by the application management 3009.

A license backup partition 4004 is used to back up a license file necessary to install the application 3011.

Figure 5:
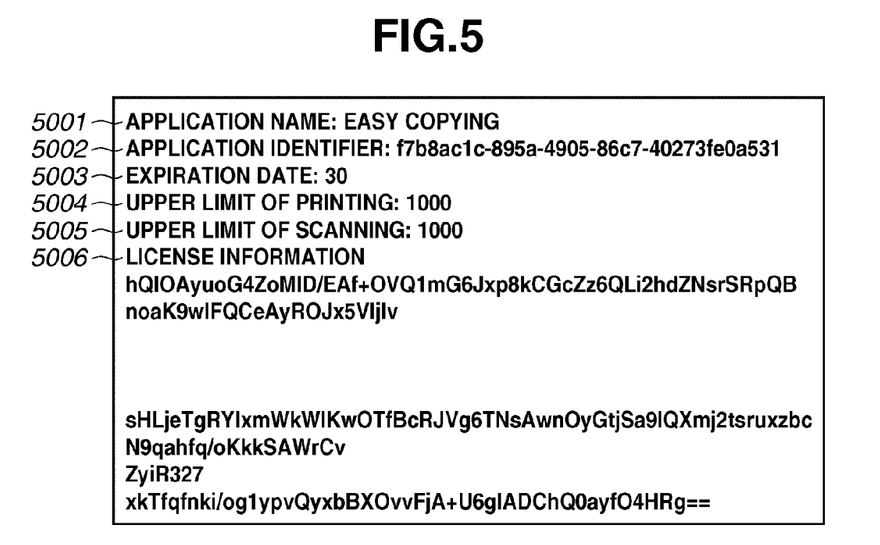
FIG. 5 illustrates an example of a license file of an application.

FIG. 5 illustrates an example of a license file for the application 3011. It is assumed that applications running on the application platform 3007 all have the similar information.

An application name 5001 indicates the name of an application that requires a license file. In FIG. 5, the application name is set as "easy copying". An application identifier 5002 is an identifier of an application that requires a license file. In FIG. 5, the application identifier 5002 is set as "f7b8ac1c-895a-4905-86c7-40273fe0a531". This identifier is set for each application to be unique to each application.

An expiration date 5003 as the operation restriction information indicates the expiration date of an application that requires a license file. In FIG. 5, the expiration date 5003 is set as "30 days later". Further, "upper limit of printing" 5004 and "upper limit of scanning" 5005 as the operation restriction information indicate the maximum printable/scannable number of image data of an application that requires a license file. In FIG. 5, the "upper limit of printing" 5004 and the "upper limit of scanning" 5005 are set as 1000.

License information 5006 indicates various types of secret information necessary to install an application that requires a license file. If the license information 5006 is tampered, the application management 3009 does not permit installation of the application 3011 and closes an application with an error message.

Figure 6:
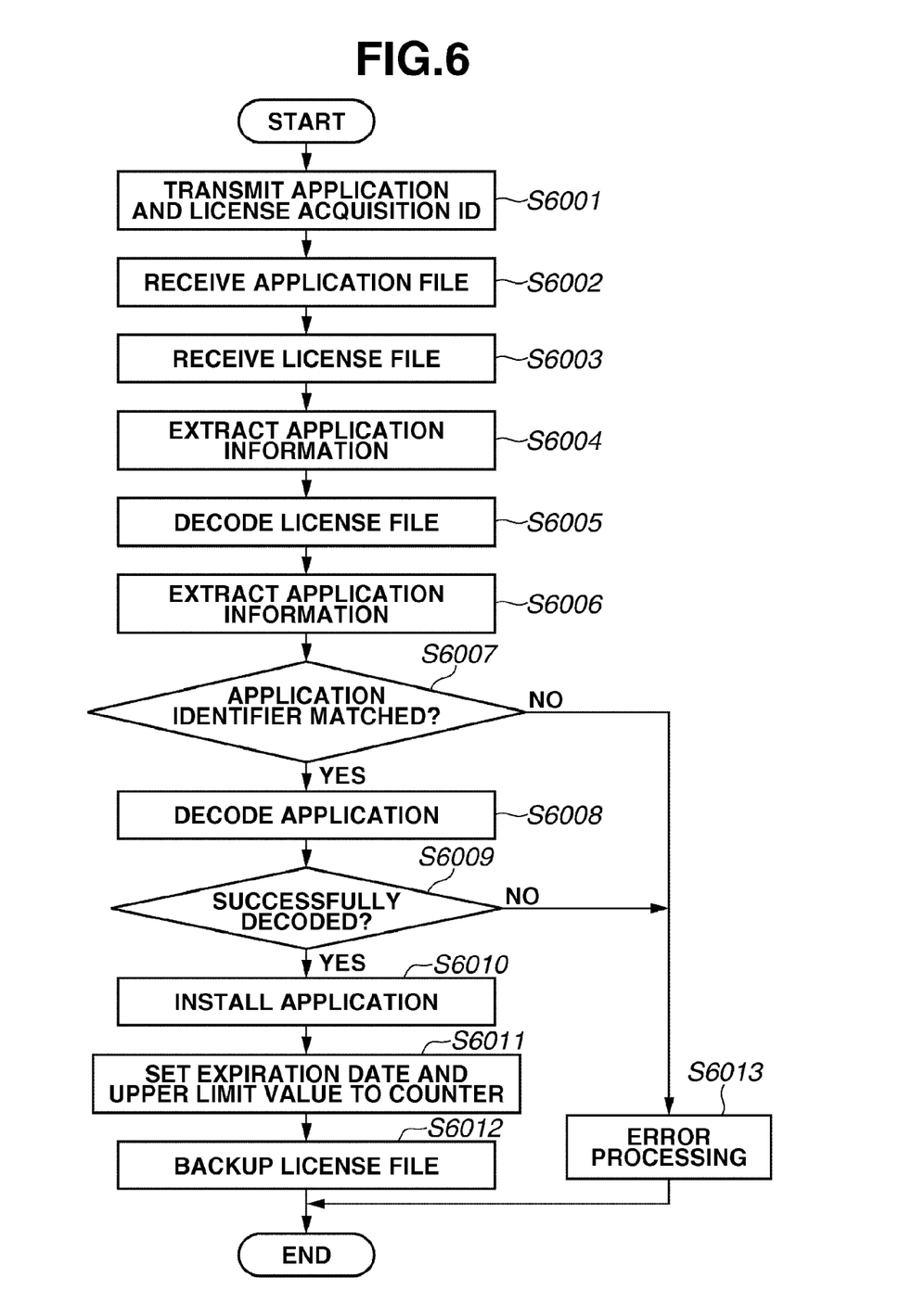
FIG. 6 is a flowchart illustrating an example of processing executed upon installing an application.

FIG. 6 is a flowchart illustrating an example of processing executed upon installing an application. The processing illustrated in the flowchart is executed by the CPU 2001 of the image processing apparatus 1001. In some embodiments, it is assumed that an application is encoded except for an application identifier and data necessary for decoding the encoded application is given by a license file. In addition, a predetermined encoding operation is performed on the license file in advance. The license file is decoded using predetermined encoding information in the image processing apparatus 1001. Moreover, a purchaser of an application acquires a license acquisition ID via an electric or print medium beforehand.

In step S6001, when the purchaser of an application inputs the license acquisition ID using the operation unit 2012, the image processing apparatus 1001 sends the license acquisition ID to the software transmission server 1006. The software transmission server 1006 identifies an application file according to the license acquisition ID to receive a license file from the license management server 1007.

The image processing apparatus 1001 receives an application file in step S6002, and receives a license file in step S6003. Next, in step S6004, the image processing apparatus 1001 extracts application information from the application file received in step S6002.

Next, in step S6005, the image processing apparatus 1001 decodes the received license file using predetermined decoding information in the image processing apparatus 1001. Next, in step S6006, the image processing apparatus 1001 extracts application information from the decoded license file (information 5001 to 5005 in FIG. 5).

In step S6007, the image processing apparatus 1001 determines whether application identifiers of the application information extracted in steps S6004 and S6006 match each other. If the identifies do not match each other (NO in step S6007), the processing advances to step S6013. In step S6013, the image processing apparatus 1001 displays an error message and terminates the processing illustrated in FIG. 6.

On the other hand, if the identifiers match each other (YES in step S6007), the processing advances to step S6008. In step S6008, the image processing apparatus 1001 obtains decoding information (not illustrated) for an application file from the license file decoded in step S6005 to decode the application file received in step S6002.

Next, in step S6009, the image processing apparatus 1001 determines whether the application file is successfully decoded. If not successfully decoded (NO in step S6009), the processing advances to step S6013. In step S6013, the image processing apparatus 1001 displays an error message and terminates the processing illustrated in FIG. 6. On the other hand, if successfully decoded (YES in step S6009), the processing advances to step S6010. In step S6010, the image processing apparatus 1001 stores the application in the application partition 4003 of the HDD 2004 via the application management 3009. As a result, the application becomes executable.

Next, in step S6011, the image processing apparatus 1001 stores an application identifier 5002, an expiration date 5003, an "upper limit of printing" 5004, and an "upper limit of scanning" 5005, which are included in the application information extracted in step S6006 in the counter 3005 (information setting). In other words, the image processing apparatus 1001 stores (sets) the application identifier 5002, included in the application information extracted in step S6006, in an application identifier of the counter 3005.

Further, the image processing apparatus 1001 stores (sets) the expiration date 5003 included in the application information extracted in step S6006, in the expiration date of the counter 3005 as threshold information. Further, the image processing apparatus 1001 stores (sets) the "upper limit of printing" 5004, included in the application information extracted in step S6006, to the "upper limit of printing" of the counter 3005 as threshold information. In addition, the image processing apparatus 1001 stores (sets) the "upper limit of scanning" 5005, included in the application information extracted in step S6006, to the "upper limit of scanning" of the counter 3005 as threshold information.

Next, in step S6012, the image processing apparatus 1001 stores the license file received in step S6003 (or the license file decoded in step S6005) to the license backup partition 4004, and terminates the processing illustrated in FIG. 6.

Figure 7:
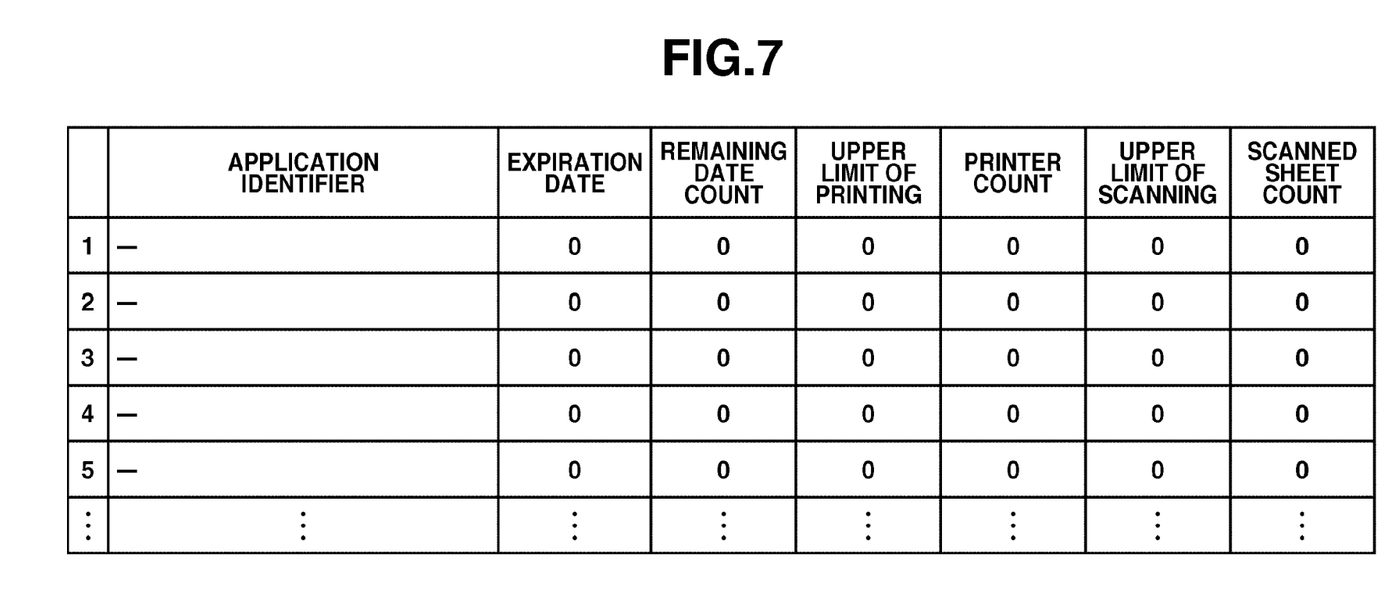
FIG. 7 illustrates an example of a counter state before performing processing illustrated in a flowchart of FIG. 6.

FIG. 7 illustrates an example of a state of the counter 3005 before the processing of the flowchart illustrated in FIG. 6 is executed. The state illustrated in FIG. 7 is an initial state of the counter 3005 where no application is installed to the image processing apparatus 1001.

Figure 8:
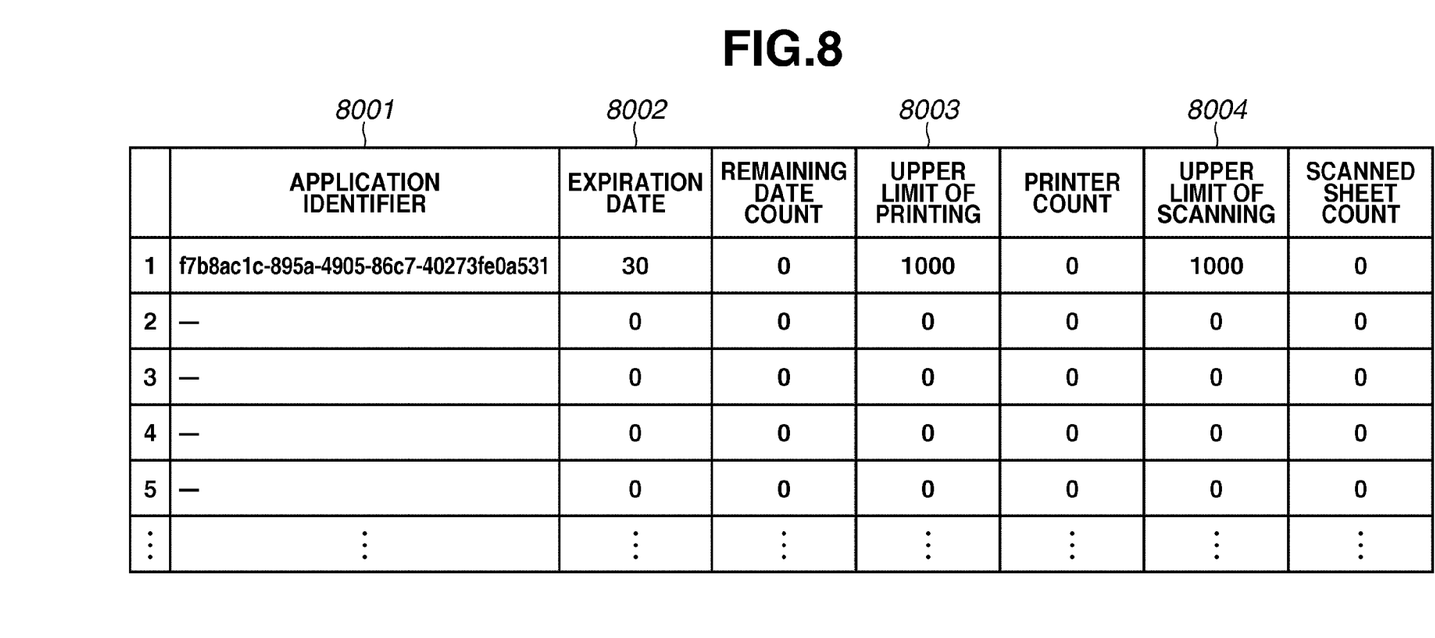
FIG. 8 illustrates an example of a counter state just after an application with an application identifier as illustrated in FIG. 5 is installed in an image processing apparatus according to the processing illustrated in the flowchart of FIG. 6.

FIG. 8 illustrates an example of a state of the counter 3005 just after the application with the application identifier illustrated in FIG. 5 is installed in the image processing apparatus 1001 according to the processing of the flowchart illustrated in FIG. 6. In the application identifier 8001, "f7b8ac1c-895a-4905-86c7-40273fe0a531" is registered. In the expiration date 8002, "30" is registered. In the "upper limit of printing" 8003, "1000" is registered. In the "upper limit of scanning" 8004, "1000" is registered.

If an application, which is identified based on the application identifier 8001, causes the printer 2095 to work, the image processing apparatus 1001 increments a count value of the counter (operation information) according to the number of printout operations (or prints). Then, the image processing apparatus 1001 registers the incremented count value of the counter to the printer count of the counter 3005.

In a similar way, if an application, which is identified based on the application identifier 8001, causes the scanner 2070 to work, the image processing apparatus 1001 increments a count value of the counter (operation information) according to the number of scanning operations (or scanned images). Then, the image processing apparatus 1001 registers the incremented count value of the counter to the scanner count of the counter 3005. Further, the image processing apparatus 1001 counts the days from installation of the application, which is identified based on the application identifier 8001 (days from first use day), and registers the counted value in the expiration-date count of the counter 3005.

If an operator sends a request to execute printing, for example, the image processing apparatus 1001 compares the "upper limit of printing" with the printer count, and if the values match each other, then the image processing apparatus 1001 limits or prohibits execution of printing or use of the printer (application operation restriction). In a similar way, if an operator sends a request to execute scanning, for example, the image processing apparatus 1001 compares the "upper limit of scanning" with the scanner count, and if the values become equal to each other, then the image processing apparatus 1001 limits or prohibits execution of scanning or use of the scanner (application operation restriction). Further, the image processing apparatus 1001 compares the expiration date with the expiration-date count, and if the values become equal to each other, then the image processing apparatus 1001 limits or prohibits use of the application (application operation restriction).

Figure 9:
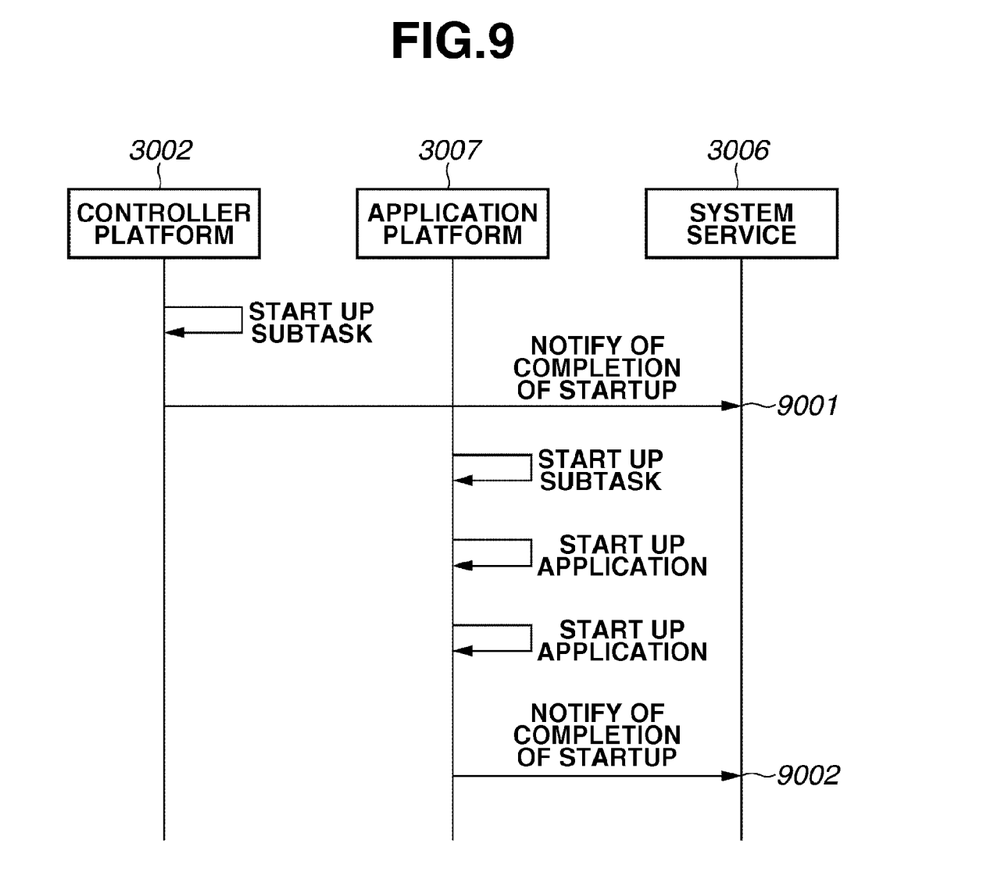
FIG. 9 illustrates an example of a normal software startup sequence executed by a central processing unit (CPU).

FIG. 9 illustrates an example of a normal startup sequence of software, which is executed by the CPU 2001.

When the image processing apparatus 1001 is powered on, the CPU 2001 executes software to start the controller platform 3002, the application platform 3007, and the system service 3006. The controller platform 3002 activates corresponding subtasks to notify the system service 3006 of the completion of the activation. The application platform 3007 activates corresponding subtasks and an application registered by the application management 3009 to notify the system service 3006 of the completion of the activation. The system service 3006 receives the completion of the activation at time points 9001 and 9002 and thus confirms that the image processing apparatus 1001 is normally booted.

Figure 10:
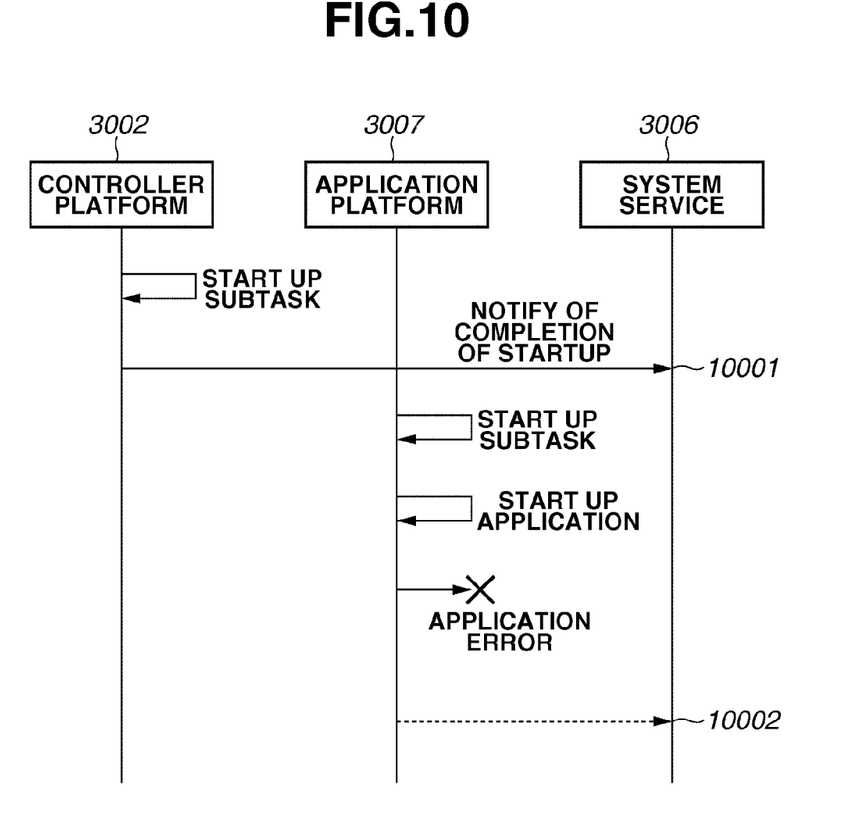
FIG. 10 illustrates an example of a abnormal software startup sequence executed by a CPU.

FIG. 10 illustrates an example of an abnormal startup sequence of software executed by the CPU 2001. FIG. 10 illustrates an example where an operation failure in a program execution environment is detected after time point 10001. Unlike the example illustrated in FIG. 9, when an application is booted up, the application is abnormally terminated. Therefore, the system service 3006 cannot receive a notification about activation completion, which would have otherwise received from the application platform 3007 at a time point 10002.

Figure 11:
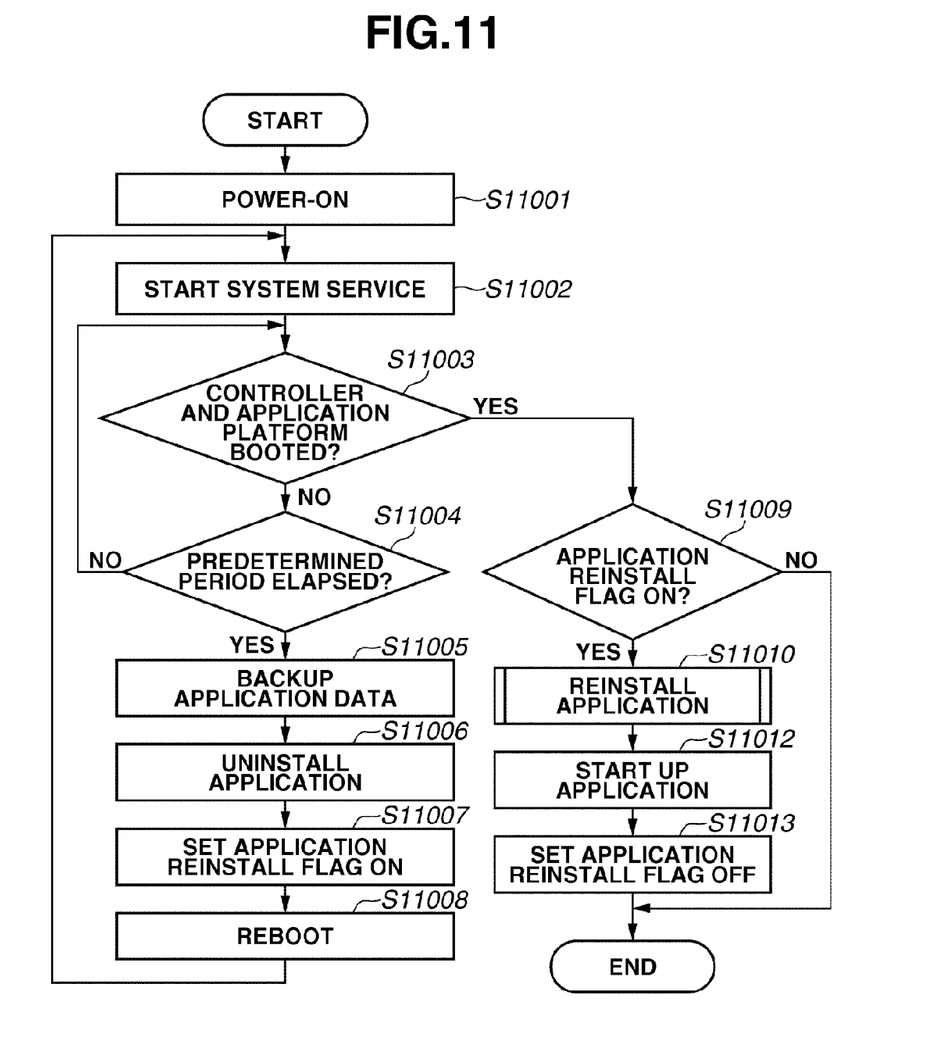
FIG. 11 is a flowchart illustrating an example of processing executed when an abnormal application execution environment is detected and an application is reinstalled.

FIG. 11 is a flowchart illustrating an example of processing executed when an abnormal application execution environment is detected and the application 3011 is reinstalled. The processing in the flowchart is executed by the CPU 2001 of the image processing apparatus 1001.

In step S11001, if the image processing apparatus 1001 is powered on, then in step S11002, the system service 3006 is started. The system service 3006 of the image processing apparatus 1001 determines whether notifications about the activation completion of the controller platform 3002 and the application platform 3007 are sent in step S11003. If the activation completion of either one is not notified (NO in step S11003), the processing advances to step S11004.

In step S11004, the system service 3006 of the image processing apparatus 1001 determines whether a predetermined time has elapsed. If not elapsed (NO in step S11004), the processing returns to step S11003, and the above procedure is repeated. On the other hand, if a predetermined time has elapsed (YES in step S11004)), the processing advances to step S11005. In step S11005, the image processing apparatus 1001 backs up application data to the temporary use partition 4002.

Next, in step S11006, the image processing apparatus 1001 uninstalls the application. Next, in step S11007, the image processing apparatus 1001 sets an application reinstallation flag stored in the SRAM 2100 to ON. Next, in step S11008, the image processing apparatus 1001 returns to step S11002 after rebooting, and repeats the above procedure.

On the other hand, in step S11003, if the notifications of the activation completion of both of the controller platform 3002 and the application platform 3007 are received (YES in step S11003), the processing advances to step S11009. As described above, if the processing is performed through steps S11005, S11006, S11007, S11008, S11002, and S11003 in this order, the system service 3006 determines that the activation is completed in step S11003, and advances the processing to step S11009.

In step S11009, the image processing apparatus 1001 determines whether the application reinstallation flag is set to ON. If the flag is set to OFF (NO in step S11009), the image processing apparatus 1001 completes the activation and terminates the startup processing. On the other hand, if the flag is set to ON (YES in step S11009), the processing advances to step S11010. In step S11010, the image processing apparatus 1001 reinstalls the application. This processing will be described in detail below with reference to FIG. 12. After the reinstallation of the application, in step S11012, the image processing apparatus 1001 starts up the application. Then, in step S11013, the image processing apparatus 1001 sets the application reinstallation flag to OFF and terminates the processing illustrated in FIG. 11.

Figure 12:
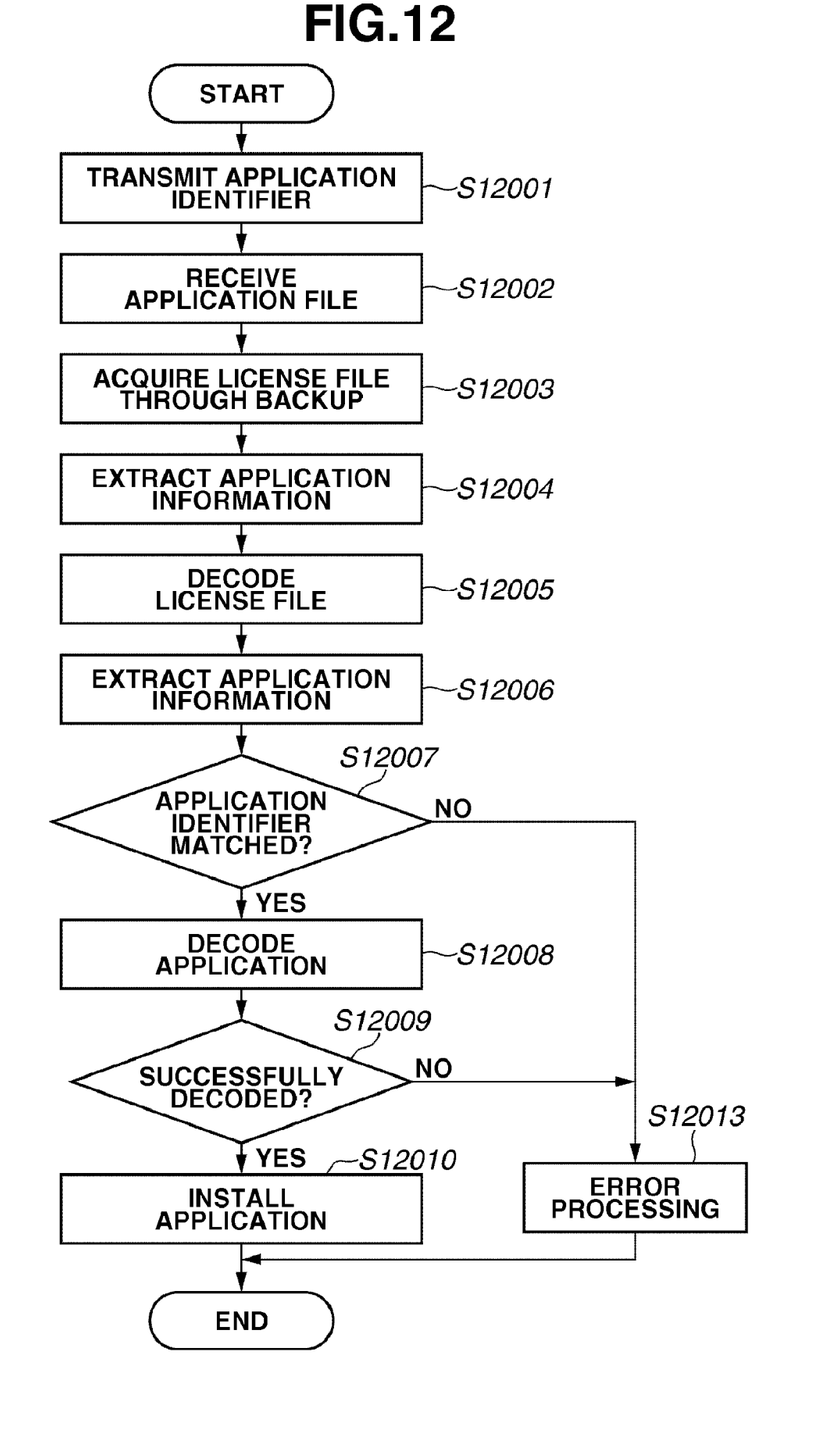
FIG. 12 is a flowchart illustrating an example of processing executed upon reinstalling an application.

FIG. 12 is a flowchart illustrating an example of processing executed when the application is reinstalled. The processing in this flowchart is executed by the CPU 2001 in the image processing apparatus 1001. In step S12001, the image processing apparatus 1001 sends an application identifier 5002 described in a license file that is stored in the license backup partition 4004 to the software transmission server 1006.

Next, in step S12002, the image processing apparatus 1001 receives an application file corresponding to the application identifier 5002. Next, in step S12003, the image processing apparatus 1001 obtains a license file from the license backup partition 4004. Next, in step S12004, the image processing apparatus 1001 extracts application information from the application file received in step S12002. Next, in step S12005, the image processing apparatus 1001 decodes the extracted license file using predetermined decoding information (not illustrated) in the image processing apparatus 1001.

Next, in step S12006, the image processing apparatus 1001 extracts application information from the decoded license file. Next, in step S12007, the image processing apparatus 1001 determines whether application identifiers of the application information extracted in steps S12004 and S12006 match each other. If the application identifiers do not match each other (NO in step S12007), the processing advances to step S12013.

In step S12013, the image processing apparatus 1001 displays an error message and terminates the processing illustrated in FIG. 12. On the other hand, if the application identifiers match each other (YES in step S12007), the processing advances to step S12008. In step S12008, the image processing apparatus 1001 extracts decoding information (not illustrated) for the application file from the license file decoded in step S12005 to decode the application file received in step S12002.

Next, in step S12009, the image processing apparatus 1001 determines whether the application file is successfully decoded. If not successfully decoded (NO in step S12009), the processing advances to step S12013. In step S12013, the image processing apparatus 1001 displays an error message and terminates the processing illustrated in FIG. 12.

On the other hand, if successfully decoded (YES in step S12009), the processing advances to step S12010. In step S12010, the image processing apparatus 1001 stores the application in the application partition 4003 of the HDD 2004 via the application management 3009, and terminates the processing illustrated in FIG. 12. As a result, the application becomes executable.

In this flowchart, the image processing apparatus 1001 does not store the application identifier 5002, the expiration date 5003, the "upper limit of printing" 5004, and the "upper limit of scanning" 5005, which are included in the application information extracted in step S12006, to the counter 3005.

Figure 13:
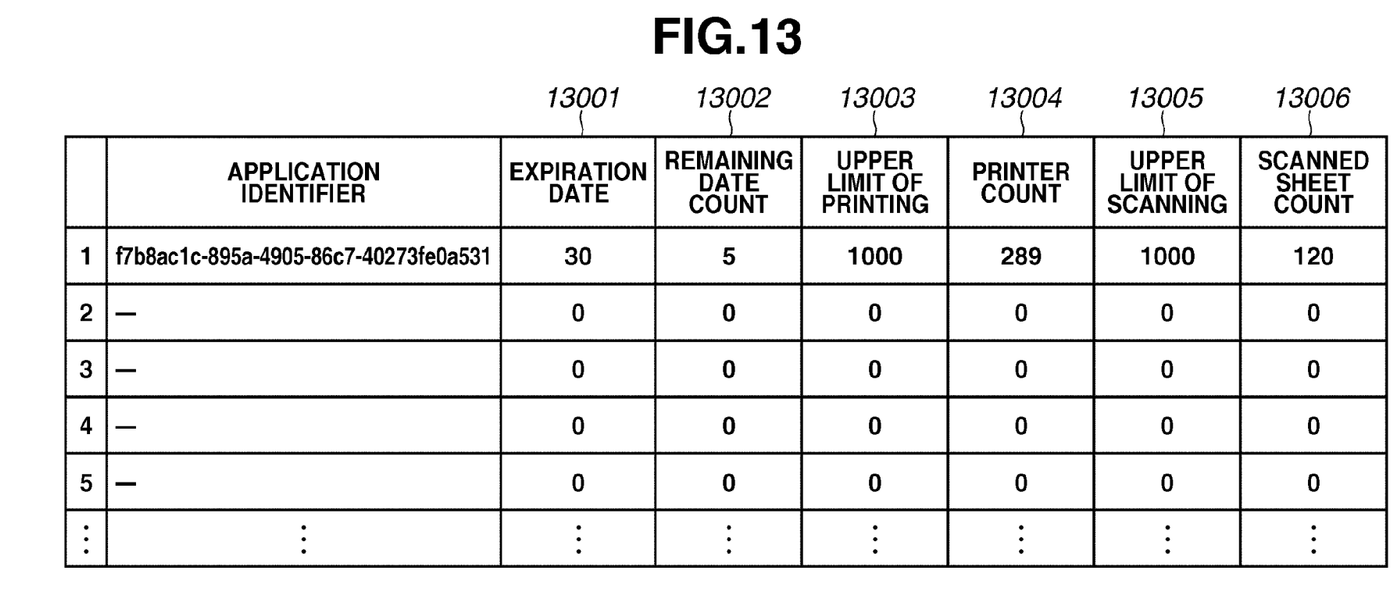
FIG. 13 illustrates an example of a counter state just before an application is uninstalled and just after an application is reinstalled illustrated in the flowcharts of FIGS. 11 and 12.

FIG. 13 illustrates an example of a state of the counter 3005 just before an application is uninstalled and just after an application is reinstalled illustrated in the flowcharts of FIGS. 11 and 12.

Values set in an expiration date 13001, an "upper limit of printing" 13003, and an "upper limit of scanning" 13005 are similar to the values obtained just after an application is installed in FIG. 8. An expiration-date count 13002, a printer count 13004, and a scanner count 13006 are maintained at a count value of the counter just before an application is uninstalled.

Some embodiments described below are based on FIGS. 1 to 10 and FIGS. 12 and 13 and are similar to embodiments described above, and the description thereof is not repeated.

Figure 14:
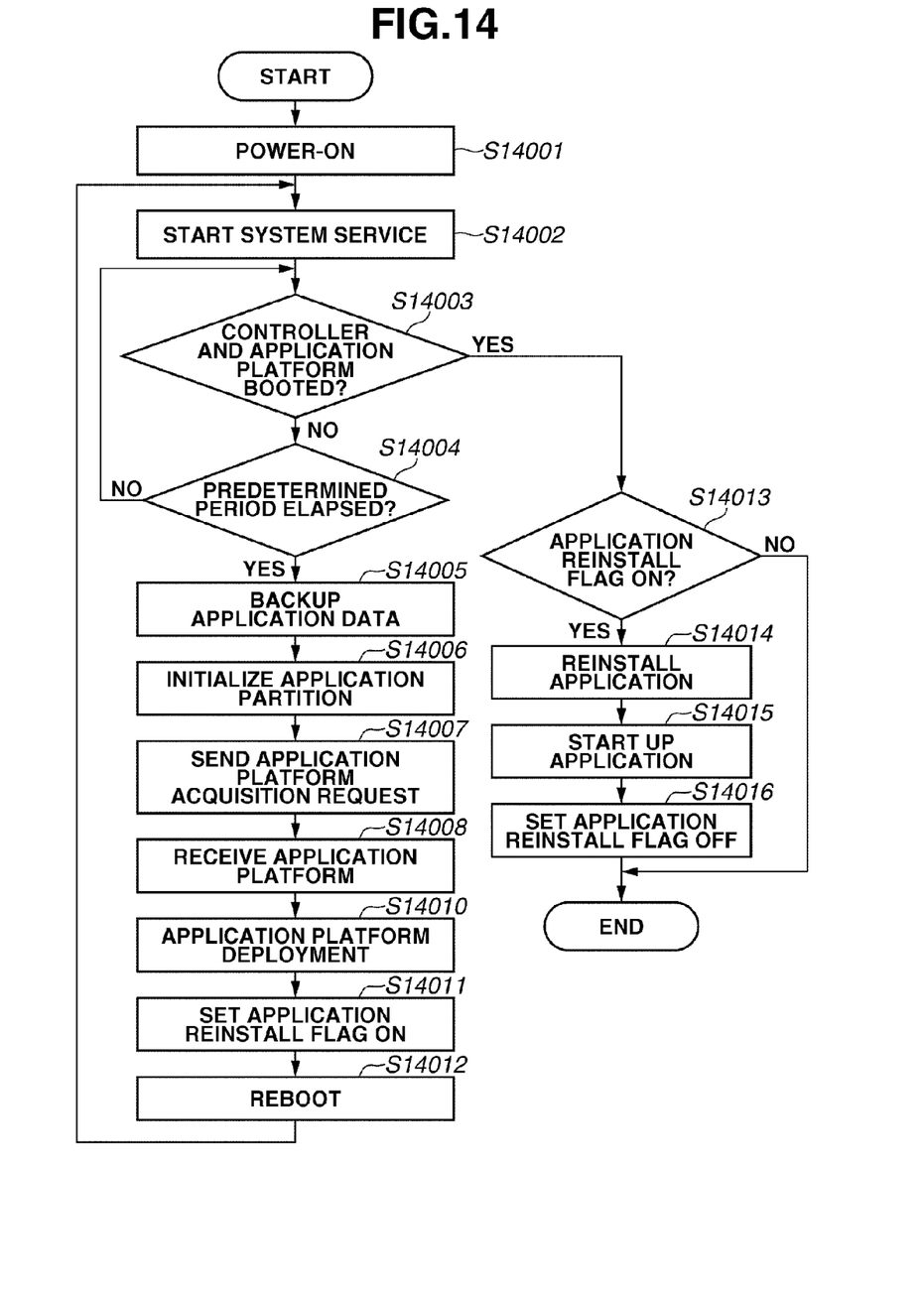
FIG. 14 is a flowchart illustrating an example of processing executed when an abnormal application execution environment is detected and an application platform and an application are reinstalled.

FIG. 14 is a flowchart illustrating an example of processing executed when an abnormal application execution environment is detected and the application platform 3007 and the application 3011 are reinstalled. The processing in this flowchart is executed by the CPU 2001 of the image processing apparatus 1001.

The processing in steps S14001 to S14005 is similar to that in steps S11001 to S11005 in FIG. 11 and thus not repeated. In step S14006, the image processing apparatus 1001 initializes the application partition 4003 to uninstall the application. Further, the image processing apparatus 1001 uninstalls the application platform 3007 from the basic program partition 4001.

Next, in step S14007, the image processing apparatus 1001 sends a request to the software transmission server 1006 to install the application platform 3007. Next, in step S14008, the image processing apparatus 1001 receives the application platform 3007.

Next, in step S14010, the image processing apparatus 1001 loads the received application platform 3007 to the basic program partition 4001 and installs the application platform 3007. Next, in step S14011, the image processing apparatus 1001 sets the application reinstallation flag stored in the SRAM 2100 to ON. Next, in step S14012, the image processing apparatus 1001 is rebooted. Then, the processing returns to step S14002 to repeat the above procedure.

The subsequent processing in steps S14013 to S14016 is similar to that in steps S11009 to S11013 in FIG. 11 and thus not repeated. Through the processing illustrated in the flowchart, the application platform 3007 and the application 3011 are both reinstalled. The state of the counter 3005 is kept as illustrated in FIG. 13.

In some embodiments, the image processing apparatus 1001 stores a license file in the license backup partition 4004 just after the installation of an application (see step S6012 in FIG. 6, for example). However, the image processing apparatus 1001 can store a license file in the application partition 4003 upon the installation and then store the license file in the license backup partition 4004 before recovery processing that is executed after an abnormal operation is detected.

More specifically, the image processing apparatus 1001 can be configured to store a license file in the license backup partition 4004 just before step S11006 in FIG. 11, and just before step S14006 in FIG. 14.

The exemplary embodiments of present invention can be accomplished as follows. A computer-readable storage medium (or a recording medium) storing software program code that realizes the functions of the above exemplary embodiments is supplied to a system or an apparatus. Then, a central processing unit (CPU) or microprocessor unit (MPU) of the system or apparatus reads and executes the program code stored in the computer-readable storage medium. In this case, the program code read from the computer-readable storage medium realizes the functions of the above exemplary embodiments, and the computer-readable storage medium recording the program code embodies the present invention.

Further, exemplary embodiments of the present invention can be also accomplished such that the central processing unit of the system or apparatus executes the read program, and an operating system (OS) running on the system or apparatus executes a part or all of actual processing based on an instruction of the program code to thereby realize the functions of the above exemplary embodiments.

Furthermore, the present invention can be also accomplished such that the program code read from the computer-readable storage medium is written to a memory of a function extension board inserted into the system or apparatus or a function extension unit connected to the system or apparatus, and then, a CPU provided to the function extension board or the function extension unit performs a part or all of actual processing according to an instruction of the program code to thereby realize the functions of the above exemplary embodiments.

If the present invention is applied to the computer-readable storage medium, the computer-readable storage medium stores program code corresponding to the above flowcharts.

According to the above exemplary embodiments, in the event of an operation failure in an application execution environment, the application execution environment or a target application can be automatically reinstalled. Moreover, if the application execution environment or a target application is automatically reinstalled, the expiration date or the maximum allowable number of operations of a predetermined function of a license-managed application can be maintained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-298397 filed Nov. 16, 2007, which is hereby incorporated by reference herein in its entirety.

What is claimed is:

1. An image processing apparatus comprising:
an installation unit configured to install an application for image processing and license information regarding the application;
an information setting unit configured to set, as threshold information, operation restriction information, which is included in the license information, regarding the application;
an application operation restriction unit configured to restrict an operation of the application such that a user is prohibited from using the application in a case where a count value obtained by counting operation information of the application exceeds the threshold information;
a determination unit configured to determine whether or not both of a start-up of a controller, which is configured to count the operation information of the application and to control an image processing unit provided in the image processing apparatus, and a start-up of an application platform, which serves as an application execution environment for executing the application with which the controller is operated and which is realized on an operation system, have been completed;
an uninstallation unit configured to recognize that the start-up of the application is abnormal and uninstall the application in a case where the start-up of the controller and the start-up of the application platform have not been determined as completed by the determination unit;
a reinstallation unit configured to reinstall the application uninstalled by the uninstallation unit at the time of a next start-up of the image processing apparatus; and
an information setting control unit configured to control the image processing apparatus so that the application restriction information included in the license information of the application reinstalled by the reinstallation unit is not added to the threshold information and set the application restriction information used before the application is uninstalled as the threshold information of the reinstalled application.

2. The image processing apparatus according to claim 1, wherein the operation restriction information includes an expiration date of the application,
wherein the information setting unit is configured to set the expiration date of the application as the threshold information,
wherein the controller is configured to count days from first use of the application as the operation information, and
wherein the application operation restriction unit is configured to restrict an operation of the application based on the expiration date of the application and the days from first use of the application.

3. A method comprising:
installing an application for image processing and license information regarding the application;
setting, as threshold information, operation restriction information, included in the license information, regarding the application;
restricting an operation of the application to prohibit a user to use the application in a case where a count value obtained by counting operation information of the application exceeds the threshold information;
determining whether or not both of a start-up of a controller, counting the operation information of the application and controlling an image processing unit provided in the image processing apparatus, and a start-up of an application platform, serving as an application execution environment for executing the application with which the controller is operated and realized on an operation system, have been completed;
recognizing that the start-up of the application is abnormal and uninstalling the application in a case where the start-up of the controller and the start-up of the application platform have not been determined as completed;
reinstalling the uninstalled application at the time of a next start-up of the image processing apparatus; and
controlling the image processing apparatus so that the application restriction information included in the license information of the reinstalled application is not added to the threshold information and setting the application restriction information used before the application was uninstalled as the threshold information of the reinstalled application.

4. A computer-readable storage medium storing a program for causing a computer to perform a method comprising:
installing an application for image processing and license information regarding the application;
setting, as threshold information, operation restriction information, included in the license information, regarding the application;
restricting an operation of the application to prohibit a user to use the application in a case where a count value obtained by counting operation information of the application exceeds the threshold information;
determining whether or not both of a start-up of a controller, counting the operation information of the application and controlling an image processing unit provided in the image processing apparatus, and a start-up of an application platform, serving as an application execution environment for executing the application with which the controller is operated and realized on an operation system, have been completed;
recognizing that the start-up of the application is abnormal and uninstalling the application in a case where the start-up of the controller and the start-up of the application platform have not been determined as completed;
reinstalling the uninstalled application at the time of a next start-up of the image processing apparatus; and
controlling the image processing apparatus so that the application restriction information included in the license information of the reinstalled application is not added to the threshold information and setting the application restriction information used before the application was uninstalled as the threshold information of the reinstalled application.

* * * * *